Patented Aug. 29, 1950

2,520,173

UNITED STATES PATENT OFFICE 2,520,173

PROCESS FOR PREPARING UNSUPPORTED FILMS OF TETRAFLUOROETHYLENE POLYMERS

Philip Francis Sanders, Lansdowne, Pa., assignor to E. I. du Pont de Nemours & Company, Wilmington, Del., a corporation of Delaware No Drawing. Application January 14, 1948, Serial No. 2,319

10 Claims. (Cl. 18—57)

This invention relates to a process for preparing unsupported films of polytetrafluoroethylene and copolymers of tetrafluoroethylene and another polymerizable organic compound, and, more particularly, a process for preparing such films from suspensions of these polymeric materials.

By the term "polymeric material," as used hereinafter, is meant polytetrafluoroethylene or copolymers of tetrafluoroethylene and one or more polymerizable organic compounds containing an ethylenic double bond, such as ethylene, vinyl chloride, vinylidene chloride, and alkyl esters of acrylic and methacrylic acids.

These polymeric materials are film-forming and have several unusual properties, such as insolubility in all common solvents, resistance to temperatures which will adversely affect most organic film-forming substances, and outstanding electrical properties, e. g., high dielectric strength and high insulation resistance. Their insolubility, however, seriously limits their application where solutions of film-forming materials have been used heretofore.

Films have been prepared by cutting or skiving sheets from a cake of the massive polymeric material. Films have also been prepared by comminuting the polymeric material and subjecting a layer of the finely divided particles to high temperatures and pressures to bring about coalescence of the individual particles. It has been proposed to deposit an organic solvent suspension of the polymeric material on a textile fabric filter cloth, remove the solvent by vacuum, apply pressure to the dried suspension to partially coalesce the particles and form a film, strip the fabric from the partially coalesced film, and sinter the film to complete the coalescense.

These previous methods, however, are not economical and are not practical methods for producing thin, continuous lengths of unsupported films of these polymeric materials.

It is an object of this invention to provide a method for preparing unsupported films of polymeric material. Another object is to provide a method for preparing such films in continuous lengths. A further object is to provide an economical method of preparing thin, unsupported films of polymeric material. A still further object is to provide a method for preparing smooth, relatively strong, and extremely flexible unsupported films of polymeric material. Other important objects will be readily apparent as the description proceeds.

These objects are accomplished by spreading a film of a suspension of the polymeric material (defined above) on a soluble metal sheet, evaporating the suspending medium, subjecting the coated metal sheet to a relatively high temperature to sinter or coalesce the particles of polymeric material, and immersing the coated metal sheet in a bath which dissolves the metal by chemical solution and leaves the film of polymeric material unsupported and unaffected by the metal dissolving solution.

By the term "soluble metal," as used herein, is meant metals which can be dissolved in acids or alkalis.

The following specific examples are given by way of illustration only, the parts being by weight:

Example 1

A thin, unsupported film of polytetrafluoroethylene was prepared from an aqueous suspensoid of the following composition:

| | Per cent |
|---|---|
| Finely divided polytetrafluoroethylene | 54.5 |
| Water | 44.1 |
| Wetting agent | 1.4 |
| | 100.0 |

The aqueous suspensoid of polytetrafluoroethylene was prepared in accordance with the disclosure set forth in copending application Serial No. 713,385, filed November 30, 1946, by Malcolm M. Renfrew, and concentrated by the method disclosed in copending application Serial No. 783,389, filed October 31, 1947, by C. K. Ikeda.

The wetting agent was the sodium salt of the sulfuric acid ester of a mixture of long chain alcohols (predominantly lauryl alcohol).

This composition was poured on one side of an aluminum panel 2" x 5" x .02" of the type used for testing paints, and hung vertically. The water was allowed to evaporate at room temperature, and, after the water had evaporated, the panel was heated for one minute at 700° F. to coalesce the particles of polytetrafluoroethylene and produce a continuous film. When the panel was cooled to room temperature, the adhesion to the aluminum panel was so great that the film could not be removed in a continuous sheet. The panel with the adherent film of polytetrafluoroethylene was immersed in a warm bath of aqueous hydrochloric acid (15 parts water and 2 parts commercial hydrochloric acid). The acid bath reacted vigorously with the aluminum panel, and the latter was completely dissolved in a relatively short time, leaving a continuous unsupported film of polytetrafluoroethylene. After washing free of acid, the unsupported film had a thickness of .0005 to .0008 inch, was smooth, continuous, and relatively strong, was extremely flexible, and was suitable for use as an insulating material for electrical conductors.

*Example 2*

A thin, unsupported film of a copolymer of tetrafluoroethylene and ethylene was prepared from a suspension of the following composition:

|  | Per cent |
|---|---|
| Finely divided copolymer of tetrafluoroethylene and ethylene (75% tetrafluoroethylene) | 36.4 |
| Dimethyl phthalate | 63.6 |
|  | 100.0 |

The suspension of the copolymer in dimethyl phthalate was prepared in accordance with the teaching set forth in copending application Serial No. 607,256, filed July 26, 1945, by Kenneth L. Berry, now U. S. Patent No. 2,448,952.

The above composition was diluted with a sufficient quantity of a mixture of equal parts of diisobutyl adipate and butyl acetate to obtain a consistency suitable for spraying. The diluted composition was sprayed on one side of an aluminum panel 4" x 1¾" x .02". The volatile solvents were allowed to evaporate at room temperature, and the coated metal panel was baked four minutes at 680° F., and then allowed to cool to room temperature. The film was strongly adherent to the metal plate and could not be removed intact therefrom by physical means. The coated metal panel was immersed in aqua regia (1 part concentrated nitric acid and 4 parts concentrated hydrochloric acid), and the metal was quickly dissolved by chemical solution, leaving a continuous film of the copolymer intact and unaffected by the acid. After the unsupported film was washed free of acid, it had a thickness of .004 inch and was ready for use.

*Example 3*

An unsupported thin film of polytetrafluoroethylene was prepared in a similar manner to that described in Example 1, except the metal plate with the adherent film of polytetrafluoroethylene was immersed in a bath of 10% aqueous sodium hydroxide solution heated to about 200° F. The caustic reacted vigorously with the metal and dissolved it completely in eleven minutes. After the unsupported film was washed free of the caustic, it had a thickness of .0007 to .001 inch, was unaffected by the hot caustic, and had the same appearance and properties as the film described in Example 1.

A modification of this invention involves a continuous process for producing thin films of polytetrafluoroethylene which employs a continuous length of aluminum foil having a thickness within the range of .0005 and .001 inch. The aluminum foil is coated on one side with the aqueous suspensoid of Example 1 by any conventional means, such as by a doctor knife, roller coating, reverse roll coating, or flow coating. Immediately after coating the foil, it is passed through a zone heated to about 200° F. to evaporate the water, and then through a zone heated to about 700° F. to coalesce the particles of polytetrafluoroethylene and produce a continuous film. The metal foil with the adherent film of polytetrafluoroethylene is next passed through an amalgamating bath to amalgamate the surface of the metal foil opposite the film of polytetrafluoroethylene, and thus increase its chemical reactivity. The metal foil with the adherent film of polytetrafluoroethylene on one side and an amalgamated surface on the opposite side is next passed through a caustic bath comprising 10% aqueous sodium hydroxide heated to about 140°–200° F. The metal foil is completely dissolved by contact with the caustic bath after a period of approximately one-half to three minutes, depending upon the temperature of the dissolving bath and the thickness of the foil. The unsupported film of polytetrafluoroethylene is then passed through a washing bath to free the film from caustic. The film produced by this method is strong, flexible, thin, and has all the valuable properties of polytetrafluoroethylene, i. e., high heat resistance, good electrical properties, and insolubility in all known organic solvents.

In addition to the copolymer of tetrafluoroethylene and ethylene of Example 2, it is within the scope of this invention to use other copolymers such as those referred to in the second paragraph, page 5, of copending application Serial No. 607,255, filed July 26, 1945, by Kenneth L. Berry, now U. S. Patent No. 2,484,483, e. g., copolymers of tetrafluoroethylene with olefinic hydrocarbons, such as ethylene and styrene; halogenated ethylenes, such as vinyl chloride, vinylidene chloride, and chlorotrifluoroethylene; vinyl esters of monocarboxylic acids, such as vinyl acetate; and alkyl esters of acrylic acid and alpha-substituted acrylic acids, such as ethyl acrylate and methyl methacrylate. Copolymers of tetrafluoroethylene and ethylene consist essentially of the reaction product of 50% to 85% tetrafluoroethylene and 50% to 15% ethylene, as disclosed in copending application Serial No. 607,256, filed July 26, 1945, by Kenneth L. Berry.

The suspension of polymeric materials may be mixed with slurries, sols, or suspensoids of inorganic materials to modify the electrical (e. g., dielectric constant) and/or physical properties, or to obtain an economic advantage. Suitable inorganic materials include titanium dioxide and kaolin slurries, silica and alumina sols, clay suspensions, etc.

In addition to the aluminum panels and foils referred to in the preferred embodiments of this invention, it is also possible to employ other soluble metal sheets during the coating and heating operations as supporting means for the film of polymeric material. Such other metals include copper, magnesium, zinc, and various alloys of the foregoing metals, as well as alloys of aluminum.

The method of preparing the unsupported films of the polymeric materials described above is adapted for preparing films of .0005 inch to .01 inch or greater thickness. To produce relatively thick films, it is sometimes desirable to apply a plurality of coats of the suspensions to the metal base, applying heat to coalesce the polymeric particles between each successive coat and until there is complete coalescence throughout the total thickness of the film.

In addition to the acid and caustic baths referred to above, it will be understood that other acids and caustics may be employed for dissolving the metal sheets by chemical solution. The selection of the metal for the coating base will determine the acid or caustic to be employed for dissolving the metal. As previously mentioned, the films of the polymeric materials are unaffected by the acids and caustics which dissolve the metal.

In addition to making unsupported films of polymeric material, the invention is also useful in preparing insulated electrodes for electrical condensers or capacitors, as they are sometimes known. A metal sheet is coated on one or both sides with the polymeric material and heated to form an adherent continuous film on the metal. Where necessary, the edges of the coating are then trimmed to expose the metal, and the exposed metal edges are immersed to a predetermined depth in a bath which dissolves the immersed metal and leaves an unsupported film of the polymeric material extending beyond the edges of that portion of the metal sheet which is untouched by the metal dissolving solution. After removal from the bath, the coated metal plates are washed thoroughly to remove all traces of electrolytes, and then dried. A stack of these coated metal plates in which there are alternate layers of metal and polymeric material will form a condenser or capacitor when the alternate metal layers are connected in two groups of parallel electrodes. The film of polymeric material which extends beyond the metal plates will prevent arcing of the electric current between the electrodes.

A condenser of slightly different design can be prepared by coating on one or both sides two lengths of metal foil with a film of the polymeric material, as described above, and dissolving the metal foil from the film along the edges, as described above. The two lengths are then rolled in a tight, compact manner with terminal connections on the separate lengths of metal foil which form the electrodes. The unsupported film which extends beyond the metal foil on all four sides of the separate lengths of metal prevents the current from arcing from one electrode to another.

In practice, it is desirable to seal the electrodes in the polymeric material by applying a coat of concentrated polytetrafluoroethylene suspensoid to the juxtaposed surfaces of the protruding edges of the polymeric material and subjecting the edges to heat and pressure before forming into a condenser. The polytetrafluoroethylene suspensoid for this purpose may be prepared as described in Example 1.

The baking temperature to bring about coalescense of the polymeric material particles deposited from the coating composition will vary with coating speed, length of oven, size and type of wire, and particular polymeric material used. The absolute minimum temperature at which fusion of polytetrafluoroethylene occurs is 621° F., and that at which fusion of the copolymer occurs is dependent upon the proportion and fusion point of the modifying material present in the copolymer, and will be somewhat less than 621° F. The maximum temperature for either type of polymeric material is that at which undesirable decomposition occurs (approximately 930° F., depending upon the above mentioned variables).

With reference to the aqueous suspensoid of polytetrafluoroethylene, other wetting agents than that disclosed in Example 1 may be used provided they are innocuous to the suspensoid.

The primary advantage of the process of this invention is that, for the first time, it is possible to produce smooth, relatively strong, and extremely flexible, thin, unsupported films of these polymeric materials in continuous lengths. The process is also economical and simple to operate.

It is apparent that many widely different embodiments of this invention may be made without departing from the spirit and scope thereof; and, therefore, it is not intended to be limited except as indicated in the appended claims.

I claim:

1. The process of preparing unsupported films of polymeric materials, which comprises coating a soluble metal sheet with a suspension of a polymeric material selected from the group consisting of polytetrafluoroethylene and copolymers of tetrafluoroethylene and another polymerizable organic compound containing an ethylenic double bond, evaporating the suspending medium, heating to coalesce the particles of the polymeric material, cooling, and immersing the coated metal in a bath which dissolves the metal, the entire process being conducted in the absence of mechanical pressure and the sheet of soluble metal being selected from the group consisting of aluminum, copper, magnesium, zinc, and alloys thereof.

2. The process of claim 1 in which the suspension is an aqueous suspension of polytetrafluoroethylene.

3. The process of claim 1 in which the suspension is an organic suspension of a copolymer of tetrafluoroethylene and another polymerizable organic compound containing an ethylenic double bond.

4. The process of claim 1 in which the suspension is an organic suspension of a copolymer of tetrafluoroethylene and ethylene.

5. The process of claim 1 in which the metal dissolving bath is acid.

6. The process of claim 1 in which the metal dissolving bath is alkali.

7. The process of claim 1 in which the suspension of polymeric material is mixed with an inorganic material.

8. The process of claim 1 in which the soluble metal sheet is aluminum.

9. The process of preparing unsupported films of polymeric materials, which comprises coating a soluble metal sheet with an aqueous suspension of polytetrafluoroethylene, evaporating the suspending medium heating the coated metal sheet at a temperature of at least 621° F. to coalesce the particles of polytetrafluoroethylene, cooling, and immersing the coated metal in a bath which dissolves the metal, the entire process being conducted in the absence of mechanical pressure and the sheet of soluble metal being selected from the group consisting of aluminum, copper, magnesium, zinc, and alloys thereof.

10. The product produced by the process of claim 1.

PHILIP FRANCIS SANDERS.

REFERENCES CITED

The following references are of record in the file of this patent:

UNITED STATES PATENTS

| Number | Name | Date |
| --- | --- | --- |
| 2,356,380 | Chollar | Aug. 22, 1944 |
| 2,440,190 | Alfthan | Apr. 20, 1948 |

FOREIGN PATENTS

| Number | Country | Date |
| --- | --- | --- |
| 437,604 | Great Britain | Oct. 28, 1935 |